Nov. 12, 1940.  L. A. SAFFORD ET AL  2,221,724
SAFETY VALVE
Filed Dec. 26, 1939
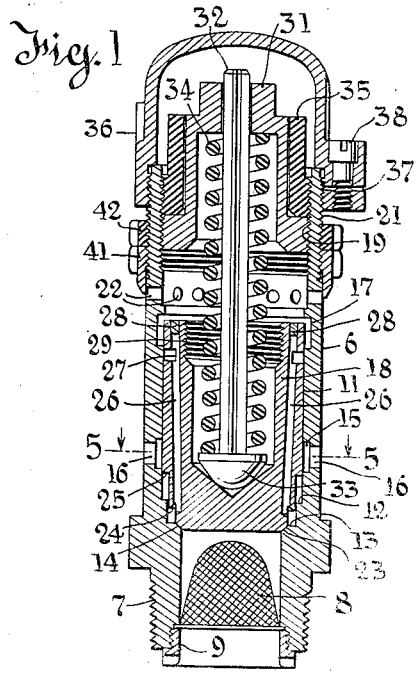
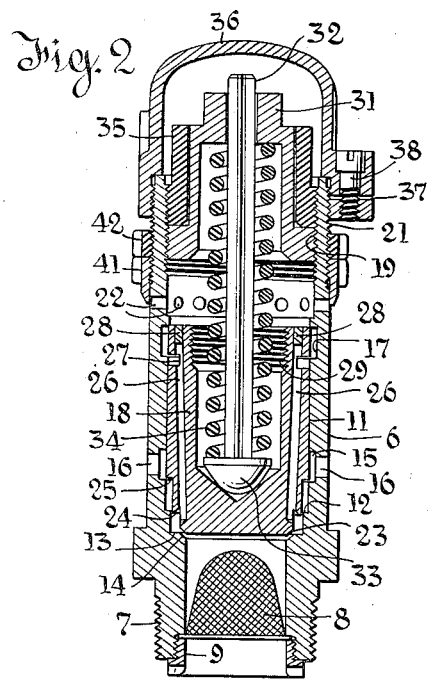
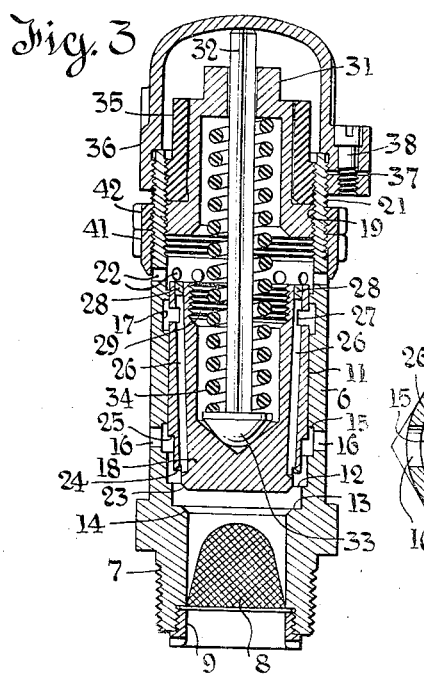
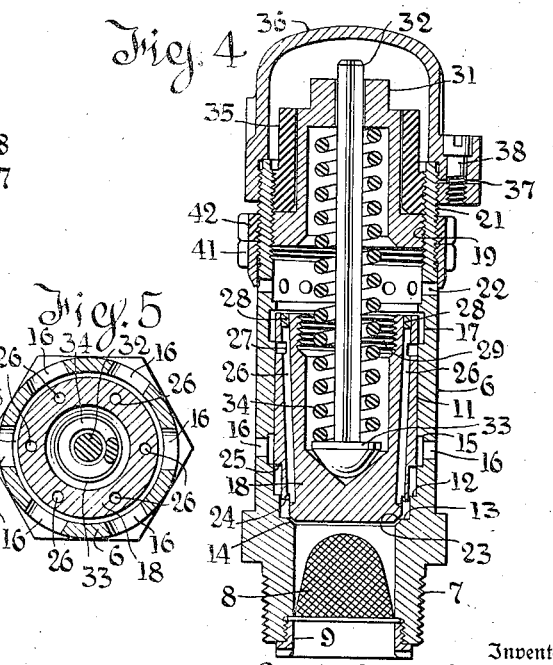
Inventor
Lewis A. Safford
and John M. Love
By
Attorneys Patented Nov. 12, 1940

2,221,724

UNITED STATES PATENT OFFICE 2,221,724

SAFETY VALVE

Lewis A. Safford and John M. Love, Watertown, N. Y., assignors to The New York Air Brake Company, a corporation of New Jersey Application December 26, 1939, Serial No. 310,992

10 Claims. (Cl. 137—53)

This invention relates to safety valves, and the object of the invention is to produce a safety valve which will combine large discharge capacity with the characteristic of closing after a relatively limited blowdown, so that the valve will regulate with precision.

The invention produces a valve which can be made in large sizes, which opens sharply at a definite pressure, which permits the pressure of opening to be adjusted within limits, and which includes means to adjust the amount of blowdown.

The result is secured by causing the valve to expose a sharply increased area as it starts from its seat in an opening direction, and preventing the development of fluid pressure resistance to opening until after full discharge pressure has been developed over the increased area. The valve then opens so rapidly to its wide open position that the development of blowdown controlling pressure has no appreciable throttling effect on the valve. From its wide open position, the valve under the urge of the spring and blowdown controlling pressure moves relatively slowly in a closing direction as a result of the reduction of discharge pressure, and then suddenly develops above the valve a sharp momentary increase in the blowdown controlling pressure, which is effective to cause the valve to close rapidly.

For purposes of comparison, a valve embodying the porting characteristics of the present invention was tested against a commercial safety valve similar in size and maximum discharge capacity. Both were set to open at 150 pounds per square inch gauge pressure. The commercial valve would develop its full capacity if adjusted for a blowdown of approximately ten pounds per square inch or more. It could be adjusted for a blowdown as small as two pounds per square inch, but when so adjusted would not open wide and exhibited a very pronounced throttling characteristic. Consequently, it had a very small discharge capacity. The valve of the present invention developed its full discharge capacity when adjusted for a blowdown as small as two pounds, and regulated very closely.

Close regulation seems to be increasingly difficult with increases in size of the valves, and it may be said that the present invention has been used in sizes as large as two-inch, without indicating that the limit of size was even being approached.

The invention has particular utility in air brake systems in which a compressor of large capacity is used to charge the main reservoir and is controlled in response to reservoir pressure by means of a so-called "pump governor." A safety valve is applied to the reservoir to protect it against excessive pressure. The safety valve must have a capacity at least equal to the charging capacity of the compressor. To render the protection effective, the valve must open at a definite pressure not greatly above the closing setting of the governor, and must not have a blowdown which will cause the pressure to fall below the opening setting of the governor. Because of the lack of large capacity in commercial safety valves at such a limited blowdown adjustment, it has frequently been necessary to use in main reservoirs a plurality of safety valves whose aggregate capacity exceeds the capacity of the compressors.

The invention is in the nature of an improvement on the valve described and claimed in the patent to Campbell and Safford, No. 2,165,611, issued July 11, 1939. That valve is characterized by precise operation and limited blowdown. Its most important feature was the fact that it would positively open and close sharply on a slowly rising pressure and thus give stable operation at a very limited blowdown adjustment when called upon for discharging small amounts of air.

Attempts to develop the Safford and Campbell valve into a large capacity valve demonstrated that structural and functional changes were necessary to give limited blowdown without interference with its maximum discharge capacity. The present invention involves the features developed to meet that new and different service requirement.

A particular embodiment of the invention will now be described in connection with the accompanying drawing, in which:

Figure 1 is a vertical axial section through the valve in closed position.

Figure 2 is a similar view showing the valve moving in an opening direction and just before discharge flow commences.

Figure 3 is a similar view showing the valve wide open.

Figure 4 shows a critical position of the valve assumed as it moves in a closing direction.

Figure 5 is a section through the valve on the line 5—5 of Figure 1.

In the drawing, 6 represents the body of the valve which terminates in a nipple 7, pipe threaded to serve as the means for connecting the valve with the discharge port from the reservoir or other pressure vessel. A strainer 8 is retained by a threaded bushing 9 and is designed to protect the valve seat from dust and grit.

Internally, the body 6 is bored out to form a cylindrical guide for the cup-shaped cylindrical valve hereinafter described, the guiding surface being indicated by the numeral 11. This terminates in a reaction shoulder 12. The body is counterbored at a somewhat smaller diameter to a second reaction shoulder 13 which surrounds the conical valve seat 14.

Some distance above the reaction shoulder 12 is an annular rectangular groove 15 cut in the body 6 and from this leads an annular series of discharge ports 16. Only two of these ports appear on the plane of section, Figs. 1–4, but Fig. 5 shows the arrangement clearly.

Above the groove 15 and formed in the body 6 is a second groove 17, also annular and of rectangular cross-section. The relation of this groove to the upper limit of the valve element 18 is clearly illustrated in the drawings and will be further explained. Above the bore 11 the body 6 is bored to slightly larger diameter and is internally and externally threaded as indicated at 19 and 21. Above the groove 17, there is an annular series of ports 22, through the body 6.

The valve element 18 is cup-shaped and has at its lower end a conical seating area 23 which mates with the seat 14. Above the area 23 there is an undercut reaction shoulder 24 which in the seated position of the valve (Figure 1) enters the counterbore below the shoulder 12 a definite distance and above shoulder 24 is a second square reaction shoulder 25 which in such seated position is below the lower margin of the groove 15 about half that distance. In other words, in the closing position of the valve, the lap at the shoulder 12 is about twice the lap at the lower margin of the groove 15. In a valve of ordinary size, these laps are of the order of $\frac{1}{32}$ and $\frac{1}{64}$ of an inch, respectively, which dimensions are suggested as illustrative and as a basis of discussion.

Extending from the lower reaction shoulder 24 through the body of the valve are ports 26, two of which are shown on the plane of section. As a rule, six are used per valve (see Fig. 5). The number to be used is a function of the size of the port and the purpose is to secure flow without serious throttling from the space below the reaction shoulder 24 to an annular rectangular groove 27 which is turned in the outer cylindrical surface of the valve. The ports 26 are formed by drilling and plugging. The plugs are indicated at 28, and the drilled ports 26 are so located as to open laterally into the groove 27 and into the space beneath the reaction shoulder 24.

When the valve is closed, the upper margin of the groove 27 is below the lower margin of the groove 17, and the lap is approximately the same as the lap of the reaction shoulder 25 below the lower margin of the groove 15. Assuming the dimensions above stated, this lap would therefore be approximately $\frac{1}{64}$ of an inch. The clearance or negative lap between the top of the valve 18 and the upper margin of the groove 17 is very slightly less than the lap at the reaction shoulder 24, so that (see Fig. 2) just before the shoulder 24 clears the shoulder 12, the upper margin of the valve 18 will start to lap the upper margin of the groove 17.

The internal threads indicated at 29 at the upper end of the valve have no functional significance and are intended for the reception of a valve pulling tool. Threaded into the internal threads 19 on body 6 is a spring seat 31. This has a central guide for the stem 32 whose enlarged head 33 enters the valve 18 and is urged downward there-against by a coil compression spring 34 which is confined between the head 33 and the spring seat 31.

The stress on the spring is adjusted by screwing the seat 31 into and out of the upper end of the housing 6 and when the proper adjustment is made, the spring seat is locked by a threaded member 35 which also engages the threads 19. The upper end of the housing is closed and the opening movement of the valve stem 32 is limited by a cap 36 which screws onto the external threads 21. To fix the cap in position, a kerf 37 is formed in a lug on its lower rim. The kerf is closed and the cap thus locked in place by means of a locking screw 38.

To throttle the ports 22 to any desired degree and thus control the blowdown of the valve, a throttling ring 41 is threaded on the external threads 21. It may be locked in adjusted positions by a nut 42, also mounted on the threads 21.

Consider the valve in its closed position (Figure 1) and assume that the spring 34 is so stressed that the valve will start to open at 150-pounds gauge pressure. When this pressure is reached, the surface 23 will crack from the seat 14 and admit fluid to the space below the first reaction shoulder 24. During the interval of time in which pressure is developing under this shoulder the ports 26 are closed because groove 27 and groove 17 are not yet in register. The valve 18 quickly assumes the position shown in Figure 4. The valve has moved far enough off its seat so that no more throttling occurs at the seat and the full discharge pressure is acting on the area of the reaction shoulders 24. Thus a sharp increase in the force moving the valve in an opening direction is developed before ports 26 are opened. Further movement of the valve is extremely rapid. It passes so quickly to and through the position shown in Figure 2, in which the grooves 17 and 27 are in register and the upper end of the valve 18 has just lapped the upper edge of groove 17, that very little fluid flows through ports 26, groove 27, and groove 17 to the space within the body 6 above valve 18. In then moving to the position of Figure 3, the valve opens the discharge ports 16 to the discharge pressure and brings both reaction shoulders into the path of the discharging fluid.

In this position the forces urging the valve in an opening direction have suffered a marked increase which has not been matched by increasing tension of the spring. Discharge pressure must therefore decrease before the valve will move in a closing direction. The regulation of this blowdown is obtained by making use of the leakage past the valve 18 into the spring chamber. By throttling the exhaust through holes 22 by the adjusting ring 41, the fluid pressure acting on top of valve 18 may be varied within wide limits and thus a force to supplement the spring force may be chosen.

As the discharge pressure diminishes, the valve starts to move slowly in a closing direction. As it reaches a position just below that of Figure 2, the grooves 17 and 27 register and the upper end of the valve clears the upper end of groove 18. Fluid from below the reaction shoulder 24, and consequently at the highest available pressure, is suddenly admitted to the spring chamber through ports 26, and gives the valve a final, sharp closing impulse. At the same time, reaction shoulder 24 laps shoulder 12 before reaction shoulder 25 laps the lower edge of groove 15. The cavity under shoulder 25 therefore suffers a sudden drop in fluid pressure, decreasing the force tending to hold the valve open.

The blowdown characteristic of the valve may, in valves of commercial size, be varied by adjustment of the throttling ring 41 from a minimum of something less than two pounds per square inch to a maximum of the order of twenty-five pounds per square inch, but throughout the range of adjustment, the valve 18, when it opens at all, opens wide and remains wide open or approximately so until the blowdown is nearly completed. While it seems reasonable to assume that adjustment of the valve for a small blowdown may be attended with some reduction of flow capacity, the selection of a low scale spring has eliminated such reduction within the range of adjustment.

The precise operating characteristics resulting from the particular port arrangement has been described in considerable detail, but timing of the sequence of port openings is also of some importance. During opening movement of the valve, the effective area exposed to discharge pressure is increased so fast that the valve is forced wide open with no hesitation. During this movement development of fluid pressure resistance is delayed until after the valve has left its seat far enough to avoid throttling. Soon after the valve reaches its wide open position, the blowdown controlling pressure above the valve reaches its normal value, and the valve starts to move slowly toward its seat. When the ports 26 open they do so at a definite discharge pressure determined by spring tension and pressure above the valve. The valve then completes its closing movement almost instantly.

Two reaction shoulders are better than one, and the best arrangement known is with two shoulders and the ports 26 leading from the lower shoulder, i. e., the one which is first subject to pressure. These features are, however, capable of some variation. The indispensible feature so far as valve capacity and precision of action are concerned, is the timing of the valve action at groove 17. Thus, the particular embodiment described is to be taken as illustrative and not limiting, within the ranges defined by the claims.

What is claimed is:

1. In a safety valve, the combination of a valve housing formed with a cylinder-like guideway for a piston-like poppet valve, a valve seat and a discharge passage leading to said seat; a piston-like poppet valve movable in said guideway to and from said seat; yielding means urging said valve toward said seat, the valve having a reaction shoulder exposed to discharging pressure fluid by opening movement of the valve and the housing having relief ports which are exposed to such fluid on further opening movement of the valve, the housing behind the valve forming a closed chamber except for vent ports of limited capacity through the wall thereof; and means including coacting ports in the valve and housing for connecting said closed chamber with the space below said reaction shoulder when the valve is within a limited range of motion intermediate its full open and its closed positions and for interrupting said connection at other times.

2. In a safety valve, the combination of a valve housing formed with a cylinder-like guideway for a piston-like poppet valve, a valve seat and a discharge passage leading to said seat; a piston-like poppet valve movable in said guideway to and from said seat; yielding means urging said valve toward said seat, the valve having a reaction shoulder exposed to discharging pressure fluid by opening movement of the valve and the housing having relief ports which are exposed to such fluid on further opening movement of the valve, the housing behind the valve forming a closed chamber except for vent ports of limited capacity through the wall thereof; and means including coacting ports in the valve and housing for connecting said closed chamber with the space below said reaction shoulder when the valve is within a limited range of motion intermediate its full open and its closed positions in which said relief ports are exposed, and for interrupting said connection in the full open position of the valve.

3. In a safety valve, the combination of a valve housing formed with a cylinder-like guideway for a piston-like poppet valve, a valve seat and a discharge passage leading to said seat; a piston-like poppet valve movable in said guideway to and from said seat; yielding means urging said valve toward said seat, the valve having a plurality of reaction shoulders of increasing diameters which are successively exposed to discharging pressure fluid by opening movement of the valve, and the housing having relief ports which are exposed to such fluid by the opening movement of the valve after exposure of the first reaction shoulder, the housing behind the valve forming a closed chamber except for vent ports of limited capacity through the walls thereof; and means including coacting ports in the valve and housing for connecting said closed chamber with the space below one of said reaction shoulders when the valve is within a limited range of motion intermediate its full open and closed positions and for interrupting said connection at other times.

4. In a safety valve the combination of a valve housing formed with a cylinder-like guideway for a piston-like poppet valve, a valve seat and a discharge passage leading to said seat; a piston-like poppet valve movable in said guideway to and from said seat; yielding means urging said valve toward said seat, the valve having a plurality of reaction shoulders of increasing diameters which are successively exposed to discharging pressure fluid by opening movement of the valve, and the housing having relief ports which are exposed to such fluid by the opening movement of the valve after exposure of the first reaction shoulder, the housing behind the valve forming a closed chamber except for vent ports of limited capacity through the walls thereof; and means including coacting ports in the valve and housing for connecting said closed chamber with the space below the fisrt exposed reaction shoulder when the valve is within a limited range of motion intermediate its full open and its closed position and for interrupting said connection at other times.

5. In a safety valve the combination of a valve housing formed with a cylinder-like guideway for a piston-like poppet valve, a valve seat and a discharge passage leading to said seat; a piston-like poppet valve movable in said guideway to and from said seat; yielding means urging said valve toward said seat, the valve having a plurality of reaction shoulders of increasing diameters which are successively exposed to discharging pressure fluid by opening movement of the valve, and the housing having relief ports which are exposed to such fluid by the opening movement of the valve after exposure of the first reaction shoulder, the housing behind the valve forming a closed chamber except for vent ports of limited capacity through the walls thereof; and means including coacting ports in the valve and housing for connecting said closed chamber with the space below the first exposed reaction shoulder when the valve is within a limited range of motion intermediate its full open and its closed position and in which said relief ports are exposed.

6. In a safety valve the combination of a valve housing formed with a cylinder-like guideway for a piston-like poppet valve, a valve seat and a discharge passage leading to said seat; a piston-like poppet valve movable in said guideway to and from said seat; yielding means urging said valve toward said seat, the valve having a plurality of reaction shoulders of increasing diameters which are successively exposed to discharging pressure fluid by opening movement of the valve, and the housing having relief ports which are exposed to such fluid by the opening movement of the valve after exposure of the first reaction shoulder, the housing behind the valve forming a closed chamber except for vent ports of limited capacity through the walls thereof; and means including coacting ports in the valve and housing for connecting said closed chamber with the space below the first exposed reaction shoulder when the valve is within a limited range of motion whose lower limit is the point of exposure of said relief ports and whose upper limit is below the full open position of said valve.

7. The combination defined in claim 6 in which the coacting ports are annular grooves in the valve and housing, the groove in the valve being near the upper margin of the valve and connected with the space below the first reaction shoulder by at least one passage formed in the valve.

8. In a safety valve the combination of a valve housing formed with a cylinder-like guideway for a piston-like poppet valve, a valve seat and a discharge passage leading to said seat; a piston-like valve movable in said guideway to and from said seat; yielding means urging said valve toward said seat, the valve and housing having two coacting sets of reaction shoulders which are successively exposed to discharging pressure fluid as the valve moves in an opening direction, and the housing having relief ports which are exposed to such fluid after exposure of the first set of reaction shoulders and fully exposed thereto in the wide open position of the valve, the housing behind the valve forming a closed chamber except for vent ports of limited capacity through the walls thereof; and means including coacting ports in the valve and housing for connecting said closed chamber with the space between the first set of reaction shoulders, the parts being so arranged that as the valve moves to wide open position initial opening movement exposes the first set of reaction shoulders to discharging pressure fluid, then the second shoulder on the valve starts to open said relief ports, then the second set of reaction shoulders are exposed to discharging pressure fluid, and the connection to the closed chamber is opened as said second shoulder starts to open the relief ports and is closed not later than the exposure of the second set of reaction shoulders.

9. The combination defined in claim 8 in which during the closing movement of the valve the opening of the connection to the closed chamber precedes the closure of the relief ports by the second reaction shoulder on the valve.

10. In a safety valve the combination of a valve housing formed with a cylinder-like guideway for a piston-like poppet valve, a valve seat and a discharge passage leading to said seat; a piston-like poppet valve movable in said guideway to and from said seat; yielding means urging said valve toward said seat, the valve having a plurality of reaction shoulders of increasing diameters which are successively exposed to discharging pressure fluid by opening movement of the valve, and the housing having relief ports which are exposed to such fluid by the opening movement of the valve after exposure of the first reaction shoulder, the housing behind the valve forming a closed chamber except for vent ports of limited capacity through the walls thereof; and means including coacting ports in the valve and housing for connecting said closed chamber with the space below the first exposed reaction shoulder when the valve is within a limited range of motion intermediate its full open and its closed position and in which said relief ports are exposed, the parts being so proportioned and arranged that in the full open position of the valve, the connection just mentioned is interrupted and as the valve moves in a closing direction, the connection is temporarily reestablished shortly before termination of exposure of the relief ports to discharging pressure fluid.

LEWIS A. SAFFORD.
JOHN M. LOVE.